June 1, 1937.　　　B. J. LOWRES　　　2,082,070
OPHTHALMIC MOUNTING
Filed July 23, 1935
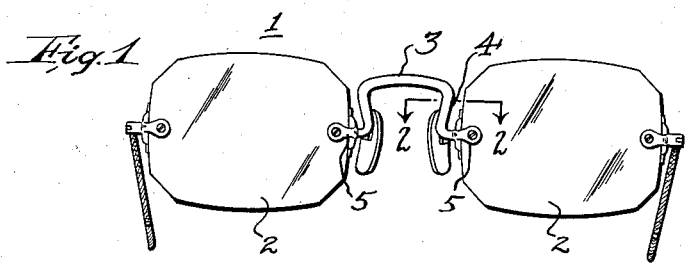
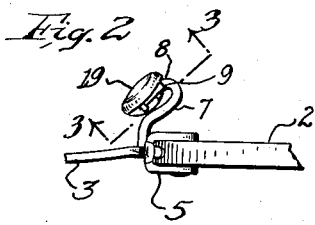
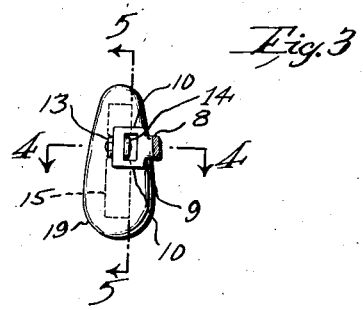
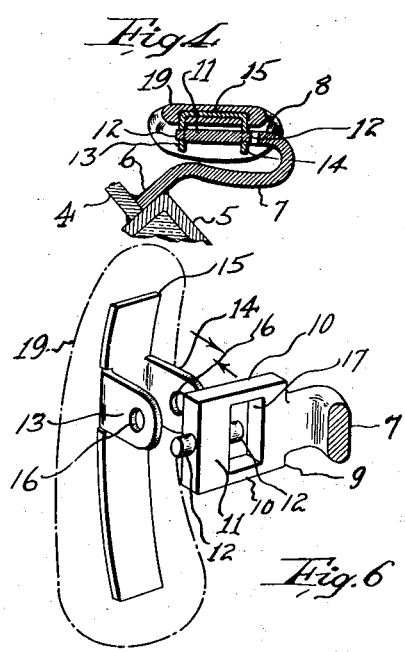
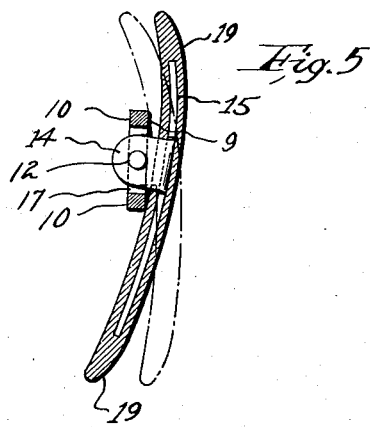
INVENTOR
Bert J. Lowres,
BY
George D. Richards
ATTORNEY Patented June 1, 1937

2,082,070

UNITED STATES PATENT OFFICE 2,082,070

OPHTHALMIC MOUNTING

Bert J. Lowres, Newark, N. J.

Application July 23, 1935, Serial No. 32,698

5 Claims. (Cl. 88—49)

This invention relates, generally, to ophthalmic mountings, and the invention has reference, more particularly, to a novel nose-guard structure adapted for use with eyeglasses and spectacles.

In fitting eyeglasses and spectacles it is necessary that the nose-guards be adjustable so that they may be positioned for properly fitting the nose contour of the wearer. This adjustment is usually accomplished by bending the nose-guard supporting arms and once this adjustment has been made it is important, in order that the eyeglasses shall fit properly, that it shall not change and that no bending or turning of the nose-guards about a vertical axis shall take place, although it is desirable that a limited rocking or self adjustment of the nose-guards about a horizontal axis be provided for.

The principal object of the present invention is to provide a novel nose-guard structure that may be readily adjusted to suit the nose contour of any particular wearer, the said nose-guard structure having hinge means for permitting limited turning or rocking of the nose-guard about a substantially horizontal axis though positively preventing any yielding of the nose-guard about a vertical axis.

Another object of the present invention lies in the provision of a novel nose-guard structure having a nose-guard plate provided with integral outstruct hinge ears for receiving therebetween a supporting yoke having trunnions journaled in bearing apertures provided in said ears, the said trunnions extending substantially horizontally for enabling limited automatic adjustment of the nose-guard about a substantially horizontal axis.

Other objects of this invention, not at this time more particularly enumerated, will be clearly understood from the following detailed description of the same.

The invention is clearly illustrated in the accompanying drawing, in which:—

Fig. 1 is a view in elevation of a pair of spectacles provided with the novel nose-guard structure of this invention.

Fig. 2 is an enlarged fragmentary sectional view taken along line 2—2 of Fig. 1.

Fig. 3 is an enlarged sectional view taken along line 3—3 of Fig. 2.

Fig. 4 is an enlarged sectional view taken along line 4—4 of Fig. 3.

Fig. 5 is an enlarged sectional view taken along line 5—5 of Fig. 3, and

Fig. 6 is a perspective view illustrating the manner of assembling the parts of the nose-guard structure.

Similar characters of reference are employed in said views, to indicate corresponding parts.

Referring now to the said drawing, the reference numeral 1 designates a pair of rimless spectacles provided with the novel nose-guard structure of this invention. Spectacles 1 have lenses 2 and the customary bridge 3 provided with depending arms 4 that are fixed at their lower portions to straps 5. Straps 5 in turn straddle the lenses 2 and are rigidly secured thereto as in the manner disclosed in my co-pending application Serial No. 13,876.

According to the preferred arrangement, the novel nose-guard structures of this invention are secured to the straps 5 although they may, if desired, be attached to the depending arms 4 of the bridge 3. Since the two nose-guard structures are counterparts one of the other, only one of them need be described in detail. The reference numeral 6 designates the fixed end of the nose-guard supporting arm 7, which arm is of approximately goose-neck shape, as viewed in plan, i. e. with the free end portion 8 thereof doubled over and extending substantially parallel to the main body of the supporting arm. This supporting arm is disposed in a substantially horizontal plane to project inwardly or rearwardly relative to the face plane of the spectacles 1.

The free end portion 8 of supporting arm 7 is struck up or otherwise formed with a rectangular frame member or head 9 having upper and lower spaced limbs 10 and a vertical connecting yoke 11 extending between the outer ends of limbs 10. Yoke 11 is provided midway of its height with oppositely extending horizontal trunnions 12 that lie in the vertical plane of frame member 9, one of said trunnions projecting outwardly from yoke 11 and the other projecting inwardly into the rectangular aperture 17 of frame member 9.

The trunnions 12 are adapted to pivotally support spaced hinge ears 13 and 14 that project from the opposite vertical side edges of a nose-guard plate 15, the ears 13 and 14 being illustrated as formed integrally with nose-guard plate 15 and bent or struck outwardly from the plane thereof. The ears 13 and 14 project from a point above the mid-height of the nose-guard plate 15 and have bearing apertures 16 for receiving the trunnions 12.

The ears 13 and 14 are spaced apart a distance substantially equal to the thickness of yoke 11 and in order to insert trunnions 12 into bearing apertures 16, the ears 13 and 14 are temporarily bent further apart so that they may receive trunnions 12 therebetween. The yoke 11 is then moved in between ears 13 and 14, the latter ear thereby entering frame aperture 17 which is of such dimensions as to accommodate this ear. With the bearing apertures 16 in alignment with the ends of trunnions 12, the ears 13 and 14 are pressed toward each other so that they telescope over trunnions 12, thereby pivotally connecting the nose-guard plate 15 to yoke 11. If desired, in mounting the nose-guard plate upon yoke 11, only the ear 13 need be bent outwardly until the distance between ears 13 and 14 equals the distance between the free ends of the trunnions 12, whereupon the ears may be mounted upon the trunnions as before described.

The nose-guard plate 15 carries a pad or facing 19 of pyroxylin or other suitable material that serves to prevent the metal plate 15 from contacting with the skin of the wearer. As thus constructed, the nose-guard plate 15 is free to rock through a limited angle about the trunnions 12, i. e. about a horizontal axis, thereby enabling the nose-guard pads to automatically adjust themselves to the nose surface without pinching, while motion about a vertical axis is effectively prevented, as is desired. Excessive rocking movement of the nose-guard about the trunnions 12 is prevented by the pad 19 contacting with the links 10, as illustrated in Fig. 5.

The goose-neck supporting arm 7 may be readily bent by pliers, thereby enabling the retail optician to conveniently fit the eye-glasses to the nose of the individual user and once the adjustment has been made, the rigidity of the supporting arm will prevent the nose-guard from moving from its adjusted position.

It will be apparent that if it is desired to replace wornout nose-pads 19 it is merely necessary to bend the ear 13 of the nose-guard plate 15 outwardly somewhat thereby permitting the nose-guard plate together with the attached pad to be removed from the trunnions 12, whereby a new nose-guard plate and attached pad may be substituted in lieu of the removed nose-guard plate and its pad.

As many changes could be made in the above construction and many apparently widely different embodiments of this invention could be made without departing from the scope thereof, as defined by the following claims, it is intended that all matter contained in the above description or shown in the accompanying drawing shall be interpreted as illustrative and not in a limiting sense.

I claim:

1. In an ophthalmic mounting, a rearwardly extending, substantially horizontal nose-guard supporting arm having an apertured rectangular frame member on its free end provided with oppositely directed trunnions, one of said trunnions extending within the aperture of said frame member, and a nose-guard pivoted on said trunnions for limited self-adjusting movement about a substantially horizontal axis.

2. In an ophthalmic mounting, a rearwardly extending, substantially horizontal nose-guard supporting arm having vertically spaced horizontal limbs on its free end portion, a vertical yoke member interconnecting the outer ends of said limbs, said yoke member having oppositely directed trunnions thereon, one of said trunnions lying within the confines of said limbs and said yoke member and a nose-guard pivoted on said trunnions for limited self adjusting movement about a horizontal axis.

3. In an ophthalmic mounting, a rearwardly extending, substantially horizontal nose-guard supporting arm having spaced horizontal limbs on its free end portion, a vertical yoke member of substantial width interconnecting the outer ends of said limbs, said yoke member having oppositely directed trunnions thereon lying in the plane of said limbs, and a nose-guard plate having struck up spaced ears pivotally mounted on said trunnions for limited self adjusting movement about a substantially horizontal axis.

4. In an ophthalmic mounting, a rearwardly extending, substantially horizontal nose-guard supporting arm having spaced horizontal limbs on its free end portion, a vertical yoke member interconnecting the outer ends of said limbs, thereby providing a rectangular receiving aperture in said arm free end portion, said yoke member having oppositely directed trunnions thereon lying in the plane of said limbs, one of said trunnions lying within said receiving aperture, a nose-guard plate having integral, bendable, spaced, apertured ears adapted to be pivotally mounted on said trunnions for limited turning movement determined by said limbs contacting with said nose-guard plate, and a facing of non-metallic material covering said nose-guard plate.

5. In an ophthalmic mounting, a rearwardly extending, substantially horizontal nose-guard supporting arm having an apertured rectangular frame member on its free end provided with oppositely directed trunnions, one of said trunnions lying within the rectangular aperture of said frame member, and a nose-guard having a nose-guard plate provided with bendable ears pivoted on said trunnions for limited self adjusting movement about a substantially horizontal axis, said bendable ears enabling the ready removal of the nose-guard from said supporting frame member.

BERT J. LOWRES.